United States Patent [19]

Chenot et al.

[11] Patent Number: 4,458,176
[45] Date of Patent: Jul. 3, 1984

[54] DAYLIGHT FLUORESCENT LAMPS EMPLOYING BLEND

[75] Inventors: Charles F. Chenot, Towanda, Pa.; Wolfgang Walter, Brookline, Mass.

[73] Assignee: GTE Products Corporation, Stamford, Conn.

[21] Appl. No.: 51,305

[22] Filed: Jun. 22, 1979

Related U.S. Application Data

[63] Continuation-in-part of Ser. No. 830,796, Sep. 6, 1977.

[51] Int. Cl.³ .............................................. H01J 1/62
[52] U.S. Cl. .................................... 313/487; 313/468
[58] Field of Search ...................... 313/487, 468, 503; 252/301.4 P (U.S.)

[56] References Cited

U.S. PATENT DOCUMENTS

| | | | |
|---|---|---|---|
| 2,488,733 | 11/1949 | McKeag et al. | 252/301.4 P |
| 2,965,786 | 12/1960 | Aia et al. | 313/486 |
| 3,509,065 | 4/1970 | Palilla | 252/301.4 P |
| 3,513,103 | 5/1970 | Shaffer | 252/301.4 P |
| 3,549,552 | 12/1970 | Broekhoven | 252/301.4 P |
| 3,670,194 | 6/1972 | Thornton et al. | 252/301.4 P X |
| 4,038,204 | 7/1977 | Wachtel | 252/301.4 P |
| 4,075,532 | 2/1978 | Piper et al. | 252/301.4 P X |

FOREIGN PATENT DOCUMENTS 956451 10/1974 Canada.

OTHER PUBLICATIONS

Walter, "Optimum Phosphor Blends for Fluorescent Lamps;" Applied Optics, vol. 10, p. 1108; May, 1971; pp. 1108-1113.

*Primary Examiner*—David K. Moore
*Attorney, Agent, or Firm*—Donald R. Castle

[57] ABSTRACT

A fluorescent lamps having colors similar to standard daylight can be prepared using two component compositions. A blue emitting phosphor having a peak emission with a specified range and a 50% band width within a specified range along with specific amounts of a yellow-emitting phosphor having a 50% band width within a specified range and a peak emission within a specified range provide a daylight lamp with a higher lumer per watt than the standard daylight lamp.

3 Claims, 3 Drawing Figures

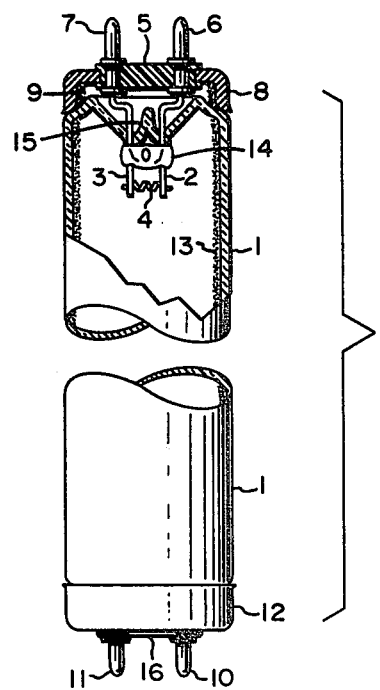
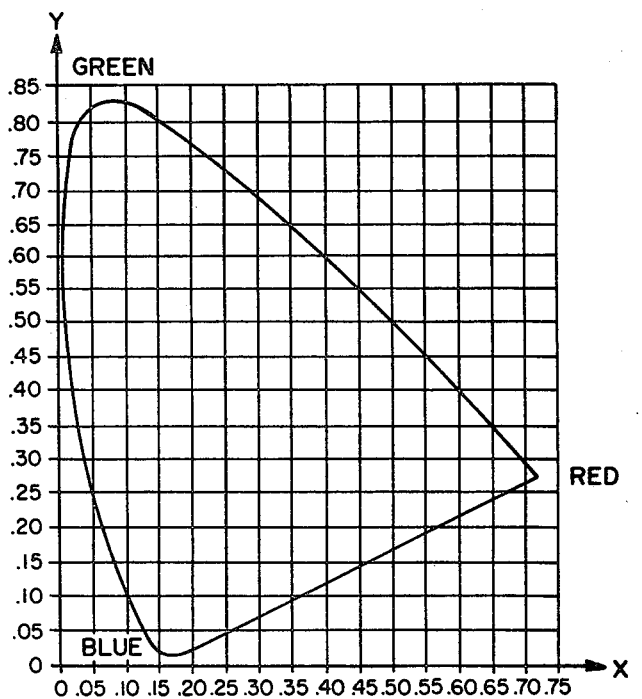
FIG. 1
FIG. 3

DAYLIGHT FLUORESCENT LAMPS EMPLOYING BLEND

CROSS REFERENCE TO RELATED APPLICATIONS

This application is a continuation-in-part of Ser. No. 830,796 filed Sept. 6, 1977.

U.S. patent application Ser. No. 839,791, filed Sept. 6, 1977, assigned to the same assignee as the present application discloses and claims a lamp containing a two-component blend which has improved results in higher lumens per watt than a standard cool white lamp.

BACKGROUND OF THE INVENTION

This invention relates to daylight fluorescent lamps and the two phosphor components incorporated therein. More particularly, it relates to lamps containing two phosphor components that yield higher lumens per watt with a suitable color rendition than prior standard daylight lamp.

The color characteristics of light emitted from a fluorescent lamp depends on the choice of phosphors used to coat the internal walls of lamp envelope. Emission spectra of luminescence centers in most phosphors consist of a single band peak at one particular wavelength. Therefore, in order to have white light it is necessary to either apply a mixture of phosphors or use a single phosphor containing more than one kind of luminescent center (such as the alkaline earth halophosphates). It is not enough to obtain the desired chromaticity coordinates and there are an infinite number of possible combinations of bands that would result in the same set of coordinates. It is also necessary that the lamp produce an acceptable luminous flux (brightness) and satisfactory optimum color rendition for all regions of the visible spectrum.

There are four standard lamps used today, daylight, cool white, white, and warm white and the desired chromaticity coordinates for these lamps are given hereinafter.

While it is possible to determine by theoretical computations the spectral energy distribution for a theoretical blue component and a theoretical yellow component that upon being blended together will yield a lamp having either brightness or color rendition maximized, such theory has to be tailored to the restraints as they exist in nature. In theory, a combination of a line emitting blue component and a line emitting yellow component would yield a lamp having the maximum brightness. Such a lamp however, cannot be produced for a number of reasons. First, phosphors having a line emission do not exist. Secondly, even if they existed the color rendition would be extremely poor because only two colors would be emitted and would result in color distortion in the area lighted by the lamp. Until recently the primary emphasis was placed upon color rendition with a suitable brightness. The single component halophosphates having two luminescent centers have been used to produce the aforementioned four white colors. The energy shortage, however, has shifted the emphasis to maximize lumens per watt of energy with an acceptable color rendition thus enabling a lower energy input to achieve the same level of brightness. While in theory, a two-component blend can produce warm white, there is no known binary combination of lumiphors that yield that color, however, an advantageous combination to produce a lamp having a chromaticity equivalent to daylight has been discovered.

It is believed, therefore, that a two-component phosphor system that takes into account the variables of brightness, color rendition and the lumiphors that exist in nature which when blended together will result in emitting light that corresponds to the standard daylight color and which maximizes the lumens per watt of energy input is an advancement in the art.

OBJECTS AND SUMMARY OF THE INVENTION

It is a further object of this invention to provide a lamp employing a two-component blend that emits light similar to the standard daylight and that has a higher lumen per watt output than present daylight lamps.

In accordance with this invention lamps are equivalent to the prior daylight lamps in chromaticity use less energy to yield comparible brightness and having a suitable color rendition are achieved by utilizing specific two-component phosphor systems that consist essentially of a first component having a specific peak emission in the yellow region and a specific band width, and a second component having a specific peak emission in the blue region with a specific band width. The parameters of peak emission and band width for each of the particular compositions for two-component system, and the ratio of the first to second component are critical to yield more efficient daylight lamp.

BRIEF DESCRIPTION OF THE DRAWINGS

FIG. 1 is a fluorescent lamp having the phosphor system of this invention deposited as a coating on the internal surfaces of the lamp envelope.

FIG. 3 is a reproduction of the complete CIE chromaticity diagram.

Figure 2:
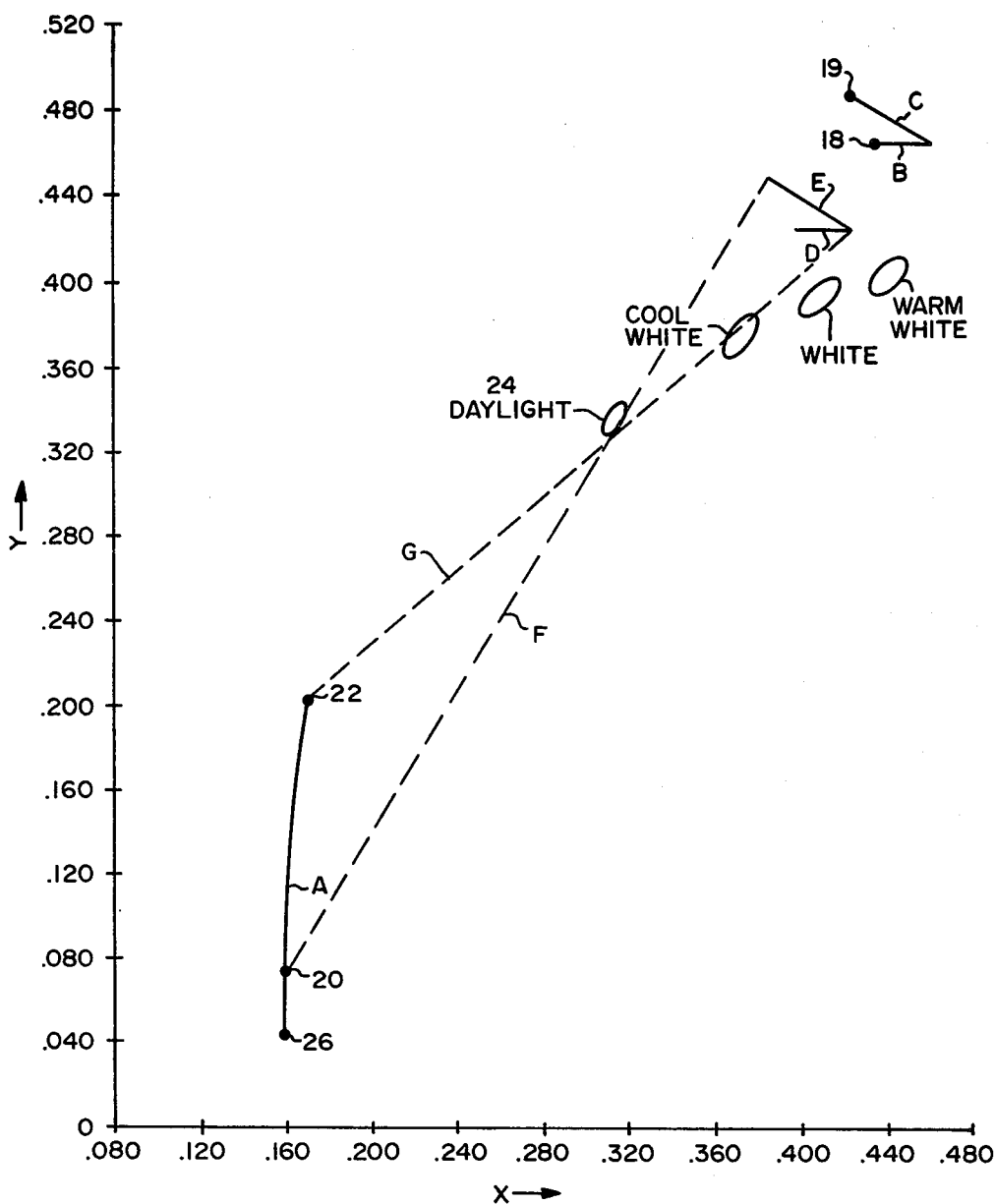
FIG. 2 is a portion of the CIE chromaticity diagram containing information helpful in explaining the present invention.

For a better understanding of the present invention, together with other and further objects, advantages and capabilities thereof, reference is made to the following disclosure and appended claims in connection with the abovedescribed drawings.

DETAILS OF THE PREFERRED EMBODIMENTS

The chromaticity coordinates for the standard lamps are as follows:

| Lamp | X | Y |
|---|---|---|
| Daylight | 0.313 | 0.337 |
| Cool White | 0.372 | 0.375 |
| White | 0.409 | 0.394 |
| Warm White | 0.440 | 0.403 |

In theory, the binary blends which would yield the maximum brightness are represented in the following table and as previously reported by Walter, one of the inventors of this invention, in *Applied Optics*, Vol. 10, page 1108, (1971).

| Lamp | % of Blue Component In The Blend | Line Emission Blue | Line Emission Yellow |
|---|---|---|---|
| Daylight | 29.1% | 444 | 567.6 |
| Cool White | 19.0% | 444 | 573.5 |

| Lamp | % of Blue Component In The Blend | Line Emission Blue | Line Emission Yellow |
|---|---|---|---|
| White | 13.5% | 444 | 576.7 |
| Warm White | 9.7% | 444 | 579.6 |

As previously mentioned phosphors having line emission do not exist in nature and lamps employing such phosphors (even if they did exist) would not yield a color rendition acceptable for most purposes. It is necessary that phosphor having a band emissions used and that the color rendering index, as defined in the aforementioned article, should be at least about 45.

Also it is possible to calculate the theoretical two-component system that would yield a lamp having a suitable color rendition and brightness. These theoretical systems are given in the table below.

|  | Daylight | Cool White | White | Warm White |
|---|---|---|---|---|
| BLUE | | | | |
| Peak (Nanometers) | 486 | 507 | 522 | 537 |
| 50% Bandwidth (Nanometers) | 111 | 121 | 128 | 135 |
| YELLOW | | | | |
| Peak (Nanometers) | 601.0 | 606.8 | 611.7 | 614.4 |
| 50% Bandwidth (Nanometers) | 85 | 44 | 44 | 44 |
| % of Yellow Component | 60.9% | 63.5% | 60.5% | 58.8% |

These data were also reported in Applied Optics, supra. In that article, an arithmetic mean of the brightness index and the color rendering index was assumed as being a suitable lamp. It has been found, however, that a CRI of from 45 to 50 can be satisfactory for most purposes.

In order to achieve more lumens per watt in a daylight lamp in actual practice the blue emitting component has a relatively narrow bandwidth and a peak emission in the range of from about 440 to 450 nanometer. The 50% bandwidth should not exceed about 65 nanometers. A broader band emitter would cause a loss in visible light and a shift in peak emission. Alkaline earth halophosphates activated with europium are preferred. These materials are represented by the formula, $Sr_{5-x-y}Ba_xEu_yCl(PO_4)_3$ wherein X is from about 0.5 to about 3.0, y is from about 0.005 to about 0.15 and the europium is in the divalent state. Chlorine is the preferred halogen. These materials and methods for preparing them are set forth in Canadian Pat. No. 956,451, incorporated by reference herein, assigned to the same assignee as the present invention. As mentioned in the aforementioned Canadian patent a small amount of manganese can be incorporated, however, a second peak occurs in the red portion of the spectrum. In preparing a daylight lamp the use of manganese is not normally needed, required nor desired.

Conventional techniques such as those used in the manufacture of conventional halophosphates such as cool white can be used to prepare the yellow-emitting component.

The yellow emitting phosphor composition useful in this invention can be represented by the formula, $$Ca_{5.0-a-w-x-y}Sr_aCd_wMn_xSb_y(PO_4)_3F_{1-y}O_y$$

wherein
a is from 0 to about 5.0-w-x-y
w is from 0 to about 0.05
x is from about 0.005 to about 0.17
y is from about 0.02 to about 0.04

The materials have a peak wavelength of from about 540 to about 570 nanometers and a 50% bandwidth of from about 60 to about 100 nanometers.

With particular reference to FIG. 2 a portion of the CIE chromaticity diagram, FIG. 3, is shown. While the chromaticity coordinates for daylight are x=0.313 and y=0.337, the lighting industry has accepted a broader definition and an industry accepted emission for daylight is an emission having chromaticity coordinates falling within the oval 24 in FIG. 2 hence for daylight the x color coordinates can vary from about 0.305 to 0.320 and the y color coordinates can vary from about 0.330 to 0.345. The ovals for the other color accepted by the lighting industry are also shown in FIG. 2.

A composition, having the formula, $Sr_{4.9}Eu_{0.10}Cl(PO_4)_3$, has x and y chromaticity coordinates as indentified by point 26 in FIG. 2. If barium is substituted for a portion of the strontium the foregoing formula the chromacity coordinates of the emission, when excited by 253.7 nanometer excitation, fall along line A in FIG. 2.

The blue emitting phosphors useful in this invention can be represented by the formula, $$Sr_{5-x-y}Ba_xEu_yCl(PO_4)_3$$

wherein
x is from about 0.5 to about 3.0
y is from about 0.005 to about 0.15

Line B represents the chromaticity coordinates for compositions having the formula $$Ca_{5.0-a-w-x-y}Sr_aCd_wMn_xSb_y(PO_4)_3F_{1-y}O_y$$

wherein
a is from 0 to about 2.0
w is from 0 to about 0.05
x is from about 0.005 to about 0.17
y is from about 0.02 to about 0.04

Line C represents the chromaticity coordinates for compositions having the formula $$Ca_{5.0-a-w-x-y}Sr_aMn_xSb_y(PO_4)_3F_{1-y}O_y$$

wherein
a is from about 2.0 to about 5.0-w-x-y
w is from 0 to about 0.05
x is from about 0.005 to about 0.17
y is from about 0.02 to about 0.04

Point 18 represents the emission of the composition wherein a is zero. Point 19 represents the emission of the composition wherein a is 5.0-w-x-y.

In a fluorescent lamp the emission from the mercury has to be considered in the overall chromaticity of emission of the lamp. When the mercury emission is considered the effective chromaticity of the yellow emission cause the emissions falling along lines B and C to shift to those falling along lines D and E respectively.

As can be seen from FIG. 2, blue emitting phosphors having emissions between points 20 and 22 on line A of FIG. 2, can be paired with any yellow emitting phosphor having a corrected emission falling along lines D and E because a line connecting the blue and yellow emitting phosphors passes through the daylight oval 24.

With particular reference to the drawing, in FIG. 1, the sealed glass envelope 1 has the lead-in wires 2, 3, sealed through one of its ends and corresponding lead-in wires sealed through the other end. The usual coiled-coil 4 of tungsten wire is supported between, and electrically connected to, the pair of lead-on wires 2, 3, and a similar coil is supported by and connected to the lead-in wires at the other end of the envelope 1. An insulating base piece 5 having contact pins 6 and 7, each pin being connected to one of the lead-in wires, held in the metal cap 8, which is fixed by the cement 9 to one end of the envelope 1, and a similar base piece 16, having contact pins 10 and 11, is cemented to the other end by cup 12.

The tungsten coils carry the usual electron-emitting coating of alkaline earth oxides, generally including also a small percentage of zirconium dioxide.

A filling of inert gas such as argon, neon, krypton, and mixtures thereof, at about 2 millimeters of mercury pressure, and the usual small quantity of mercury is inside the glass envelope 1. The lamp has the usual stem press 14 and sealed exhause tube 15.

On the inside surface of the envelope, is a layer 13 of the two component phosphor system described herein. Under present lamp manufacturing methods it is preferred to use a relatively uniform blend of the two component system, however, the present invention is not so limited. It is merely necessary that each of the phosphors be uniformly distributed over the internal surface of the glass envelope.

If a uniform blend is utilized from about 30 to about 60% by weight of the blue emitting component is used. The amounts of the blue-emitting and the yellow-emitting components will depend upon the particular components chosen. As is known in the art when the phosphors are of the same quantum efficiency the levels of each phosphor can be determined by measuring the distance from the desired daylight point of $x=0.313$ and $y=0.337$ to the x and y coordinates of the individual phosphors corrected for the mercury emission. The amount of each component would be inversely proportional to the distances each of the phosphors are from the aforementioned daylight target. As is also known in the art corrections must be made for the relative quantum efficiencies of the individual phosphors.

If desired, the individual phosphors can be applied to the envelope as separate layers in which case due to the inner layer being exposed to the more intense ultraviolet radiation the amount of the phosphor chosen as the inner layer is reduced from that required in a blend. The amount can be about 10% of that required in when a uniform blend is used. Therefore in the case where the blue component is used as the inner layer from about 3% to about 30% of the total phosphor component would be the blue emitting phosphor. In the present invention it is preferred to apply the yellow emitting phosphor as the outer layer and the blue emitting phosphor as the inner layer, however, it is not required. Thus, in the practice of this invention from about 30% to about 60% of the total phosphor content is the blue emitting phosphor and the balance is yellow emitting phosphor depending upon the method used to deposit the phosphors.

While there has been shown and described what are at present considered the preferred embodiments of the invention, it will be obvious to those skilled in the art that various changes and modifications may be made therein without departing from the scope of the invention as defined by the appended claims.

What is claimed is:

1. A fluorescent lamp comprising a sealed envelope, electrodes therein, a filling of an inert gas, and a mercury therein, and a coating of a phosphor component on the inside surface of said envelope, characterized in that said phosphor component consisting essentially of from about 3 to about 60 weight percent of a blue emitting phosphor having the formula, $Sr_{5-x-y}Ba_xEu_yCl(PO_4)_3$, wherein x is from 0.5 to about 3.0 and y is from about 0.005 to about 0.15 and having a peak emission of from about 440 to about 450 nanometers and a 50% bandwidth of from about 25 to about 65 nanometers and the balance being a yellow emitting phosphor composition having the formula, $Ca_{5.0-a-w-z-y}Sr_aCd_wMn_xSb_y(PO_4)_3F_{1-y}O_y$, a is from 0 to about 5.0-w-x-y, w is from 0 to about 0.05, x is from about 0.005 to about 0.17, y is from about 0.02 to about 0.04, having a peak emission of from about 540 to about 570 nanometers and a 50% bandwidth of from about 60 to about 100 nanometers, said lamp exhibiting a color falling within the daylight ellipse on the CIE diagram.

2. A fluorescent lamp according to claim 1 wherein phosphor is deposited as a blend and said blue emitting phosphor is from about 30 to about 60 weight percent of the total phosphor composition.

3. A fluorescent lamp according to claim 1 wherein said phosphor component consists of an inner layer of the blue emitting phosphor component and said inner layer constitutes from about 3 to about 30% of the total phosphor content.

* * * * *